United States Patent
Walter et al.

[11] Patent Number: 5,908,092
[45] Date of Patent: Jun. 1, 1999

[54] FLUID OPERATED BRAKE DEVICE

[75] Inventors: David Thomas Walter, Milton Keynes; Simon Paul Dommett, Wootton; Barry Pearson, Bedford, all of United Kingdom

[73] Assignee: Wichita Company, Limited, Bedford, United Kingdom

[21] Appl. No.: 08/256,949

[22] PCT Filed: Feb. 11, 1993

[86] PCT No.: PCT/GB93/00284

§ 371 Date: Jul. 27, 1994

§ 102(e) Date: Jul. 27, 1994

[87] PCT Pub. No.: WO93/15943

PCT Pub. Date: Aug. 19, 1993

[30] Foreign Application Priority Data

Feb. 14, 1992 [GB] United Kingdom .................... 9203216

[51] Int. Cl.⁶ .................................................. F16D 55/32
[52] U.S. Cl. ........................................................ 188/368
[58] Field of Search ............................ 188/368; 285/319, 285/137.1

[56] References Cited

U.S. PATENT DOCUMENTS

| 2,510,125 | 6/1950 | Meakin | 285/319 |
| 4,754,993 | 7/1988 | Kraynick | 285/319 |
| 4,982,736 | 1/1991 | Schneider | 285/137.1 |

FOREIGN PATENT DOCUMENTS 0 219 938  4/1987  European Pat. Off. .

*Primary Examiner*—Matthew C. Graham
*Attorney, Agent, or Firm*—Seidel, Gonda, Lavorgna & Monaco, PC

[57] ABSTRACT

A brake device has a housing in two parts releasably connected together by bolts. Co-operating pressure fluid passages in the two housing parts communicate pressure fluid from a source to actuators within the housing, and include separable plug and socket connectors located on the respective housing parts so that separation of the housing parts effects disconnection of the actuators from the pressure fluid source. A non-return valve is arranged to close on separation of the housing parts and to be opened again by the plug connector. An electrical connection to an electrically powered cooling fan can be similarly broken when the housing parts are separated.

8 Claims, 1 Drawing Sheet

FLUID OPERATED BRAKE DEVICE

DESCRIPTION

This invention relates to fluid operated brake devices, such as are employed industrially for example in papermaking and related fields.

Such brake devices typically comprise a brake disc secured to a rotatable shaft which is to be braked and against which brake pads are selectively engaged by pneumatically powered actuators. For protection, operative parts of such a device are enclosed in a housing which must allow convenient access to the operative parts for servicing. The invention is accordingly concerned with the provision of a fluid-operated brake device having a housing which facilitates safe and convenient servicing of the device.

Thus from EP-A-0 219 938 there is known a brake device of the kind having fluid-operated actuator means for applying a braking force, the brake device comprising a housing having first and second parts which are relatively displaceable from a closed position to permit access to at least a part of the housing interior, a pressure fluid connection element at the housing exterior for connection with a source of pressure fluid, and passage means communicating the pressure fluid connection element with the actuator means.

In accordance with the invention there is provided a brake device of this kind in which the passage means are in the first and second housing parts and include separable cooperating connectors located on the first and second housing parts respectively so that displacement of the housing parts effects disconnection of the actuator means from the pressure fluid source.

A non-return valve upstream of the air supply connection between the two housing parts, and arranged to be held open when the parts are assembled, can be provided.

Considerable heat can be generated frictionally within the housing of a fluid operated brake device and an electric cooling fan can be incorporated in the housing. In this event, the electric power supply can be carried through the separable housing parts in a similar way so that access to the fan cannot be obtained without its being isolated from its power supply.

The invention is further described below, by way of example, with reference to the accompanying drawings, in which.

The illustrated brake device 10 comprises a two-part housing having a rear part 11 and a front part 15. The housing interior accommodates a brake disc received secured to a shaft extending into the housing, to which braking pressure is to be applied. Pneumatic actuators are mounted within the housing on the front part 15, for selective actuation to applied braking pads to the brake disc. Such brake mechanisms are known and are therefore not further described. For details of an exemplary mechanism of this kind, reference may be made to EP 0 219 938.

Figure 1:
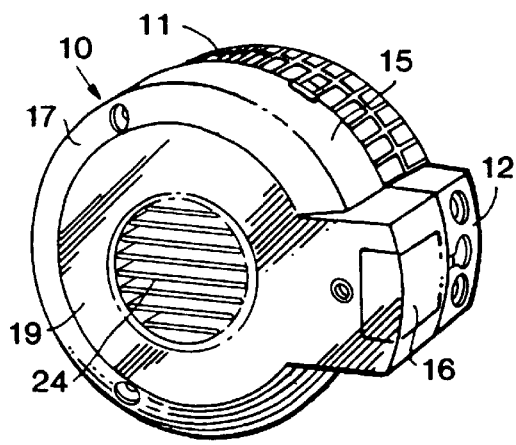
FIG. 1 is a perspective view of a brake device, including a two-part housing, in accordance with the invention.
Figure 2:
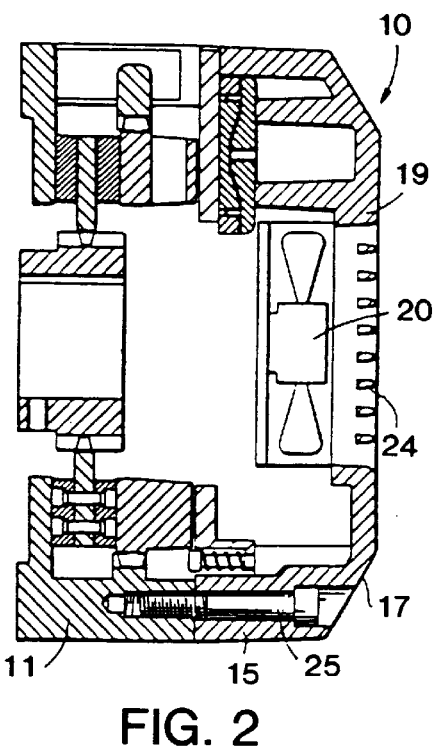
FIG. 2 is a sectional side view of the brake device of FIG. 1.
Figure 3:
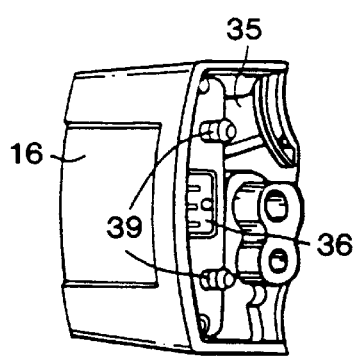
FIGS. 3 & 4 are partial perspective views, from different viewpoints, of connector portions of the two parts of the brake device housing after separation.

The housing rear part 11 has the shape of an axially short cylinder except for a connector portion 12 extending radially outwardly, as shown at the right in FIG. 1. The outer or front part 15 of the housing is generally similarly shaped, with a radially outwardly extending connector portion 16 overlying the portion 12, but has a frustoconical portion 17 converging forwardly to a front plate 19.

The operation of the braking mechanism within the housing generates substantial heat, and the device 10 incorporates positive cooling means in the form of an electrically powered fan 20 mounted in the front part 15. The fan comprises an electric motor driving an impeller vane assembly to rotate about the axis of the housing, so as to draw in cooling air from the outside through a grill 14 provided in the front plate 19.

The rear and front housing parts 11 & 15 are releasably secured together by bolts 25 extending through holes extending through the side wall of the front housing part into tapped recesses in the side wall of the rear part.

Compressed air and electric power has to be supplied to the illustrated brake device for energisation of the pneumatic brake actuators and the cooling fan 20 respectively. Provision is made accordingly for the connection of pneumatic and electrical power supplies from external sources to the projecting connector portion 12 of the rear housing part 11 by way of respective connector elements 30 and 31, as shown in FIG. 4.

It is of course necessary for the power supplies to be fed through to the front housing part 15 which mounts the pneumatic actuators and the electric fan 20. In accordance with the invention, the supplies are carried into the connector portion 16 of the housing part 15 through separable connector means, so that the supplies are disconnected from the components which they energise when the housing is opened for servicing. This is achieved in that separation of the two housing parts 11 & 15 necessarily results in disconnection of the power supplies from the actuators and the fan.

Figure 4:
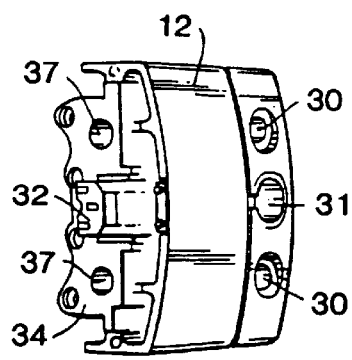

As shown in FIG. 4, the electrical power supply is conveyed within the connector portion 12 from the connector element 31 to an electrical connector socket 32, accessible at the outer face 34 of the connector portion which is juxtaposed to the inner face 35 of the connector portion 16. The juxtaposed side 35 mounts a co-operating three-pin plug 36, at a position for reception in the socket 32 when the two housing parts, and thus the connector portions 12 & 15 are, assembled together. Similarly, the air supply connections 30 communicate within the connector portion 12 with sockets 37 at the outer face 34 of the rear connector portion. From the opposed face 35, plug connectors 39 project at positions to be received in the sockets 37 when the housing parts are assembled together.

Thus, separation of the two housing parts 11 & 15 for servicing the brake mechanism and/or the fan 20, necessarily results in disconnection of the pneumatic and electric power supplies to those components. Preferably, the air supply passages within the connector portion 12 include check or non-return valves (not shown) biassed to prevent air supply outwardly of the sockets 37, which check valves are forced into an open position by the plug connectors 39 in the assembled condition of the housing parts. The check valves can thus each comprise a ball or other valve member urged against a valve seat 46 by a bias spring 46 and displaced from the seat by being engaged by the connector 39.

The present invention can be embodied in a variety of ways other than as specifically illustrated and described.

We claim:

1. A brake device comprising:
   a housing having first and second parts, said housing parts being adapted for relative displacement from a closed position of said housing, braking means responsive to fluid pressure received in one of said first and second housing parts a pressure fluid connection element mounted on the other of said housing parts, said connection element being adapted for connection with a source of pressure fluid, passage means in said housing communicating said pressure fluid connection element with said braking means, and first and second separable co-operating connectors included in said passage means, said first and second connectors being located on said first and second housing parts respectively, whereby said relative displacement of said first and second housing parts effects disconnection of said braking means from said pressure fluid connection element.

2. The brake device of claim 1 wherein said co-operating connectors are located at respective faces of said first and second housing parts, said faces being juxtaposed in said closed position of said housing.

3. The brake device of claim 2 wherein said connection element is located at a surface of one of said housing parts, said surface extending transversely to said juxtaposed faces.

4. The brake device of claim 1 wherein said housing parts comprise generally cylindrical main portions and respective juxtaposed connector portions mounting said connection element and said co-operating connectors, said juxtaposed connector portions projecting outwardly from said main portions of said housing parts.

5. The brake device of claim 1 further comprising an electrically powered cooling fan within one of said first and second housing parts, an electric power supply connection element on the other of said first and second housing parts for connection with an electric power supply source, conductor means in said first and second housing parts communicating said electric connection element with said fan, and separable co-operating contacts included in said conductor means and located on said first and second housing parts respectively so that said displacement of said housing parts effects disconnection of said fan from said electric power supply connection element.

6. The brake device of claim 5 wherein said co-operating contacts are located adjacent and spaced from said co-operating connectors.

7. A brake device comprising:

a housing having front and rear housing parts, and securement means releasably securing said front and rear housing parts together in a closed position of said housing, a brake disc received within said rear housing part and adapted for securement to a shaft to be braked, brake pad means and fluid-operated actuator means within said front housing part, said actuator mean being responsive to fluid pressure to urge said brake pad means against said brake disc in said closed position of said housing, a pressure fluid connector element on said rear housing part, said fluid connector element being adapted for connection to a source of pressure fluid, plug and socket connection member on said front and rear housing parts respectively, said connection members being releasably engageable and being engaged in said closed position of said housing, first passage means in said rear housing part communication said socket connector element with said pressure fluid connector element, and second passage means in said front housing part communicating said plug connector element with said actuator means.

8. The brake device of claim 7 further comprising electrically energizable cooling means in said front housing parts, an electrical input connector on said rear housing part, electrical conductor means electrically connecting together said input connector and said cooling means, and separable plug and socket connectors included in said conductor means, said plug and socket connectors being located on said front and said rear housing parts respectively.

* * * * *